(12) United States Patent
Gray et al.

(10) Patent No.: US 7,464,783 B2
(45) Date of Patent: Dec. 16, 2008

(54) SEALING ACCESS PLATE

(75) Inventors: Mathew A. Gray, Walled Lake, MI (US); R. Donald Hollinger, Bloomfield, MI (US); Luigi R. Magnanti, Hartland, MI (US); Rodolfo H. Perez, Troy, MI (US); Tito G. Perez, Toluca (MX); Uzziel A. Ramirez, Toluca (MX); Rodolfo De La Mora, Toluca (MX); Jesus M. Piter, Col. Del Valle (MX); John T. Freiwald, Clarkston, MI (US); Aldo Maya, Naucalpan De Juarez (MX); Thomas C. Sliney, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 519 days.

(21) Appl. No.: 11/204,985

(22) Filed: Aug. 16, 2005

(65) Prior Publication Data

US 2007/0039769 A1 Feb. 22, 2007

(51) Int. Cl.
*B62D 25/10* (2006.01)
*B62D 33/06* (2006.01)

(52) U.S. Cl. ............................. 180/89.17; 296/190.08; 49/463

(58) Field of Classification Search .............. 180/89.17, 180/89.18, 69.2, 69.24, 90; 280/69.24; 296/190.08, 296/193.11; 49/463, 466
See application file for complete search history.

(56) References Cited

U.S. PATENT DOCUMENTS

| | | | | |
|---|---|---|---|---|
| 2,172,831 | A * | 9/1939 | Carlson ................. | 296/203.01 |
| 4,623,186 | A * | 11/1986 | Chavarria et al. .......... | 296/1.07 |
| 6,626,256 | B2 * | 9/2003 | Dennison et al. ......... | 180/69.24 |
| 6,663,170 | B1 * | 12/2003 | Miga ..................... | 296/190.08 |
| 6,726,418 | B2 * | 4/2004 | Dickinson et al. ........... | 411/182 |

* cited by examiner

*Primary Examiner*—Eric Culbreth
*Assistant Examiner*—Joseph Rocca

(57) ABSTRACT

The invention concerns an access plate for use in a vehicle to cover an aperture in an engine ring, where the engine ring and an engine cover seal against each other. The access plate may include a main body portion, made of a first material having a first durometer, extending across the aperture, and defining a first portion of an outer surface that sealingly engages with the second component; and a seal, made of a second lower durometer material, wherein the seal portion is integral with the main body portion, and the seal portion includes an underside surface in opposed relation to the outer surface that sealingly engages with first component. The access plate may include snap clips, to secure the plate to the engine ring, locating pins to locate the access plate on the ring, and tapered end features to assure a good seal against the engine cover.

14 Claims, 3 Drawing Sheets

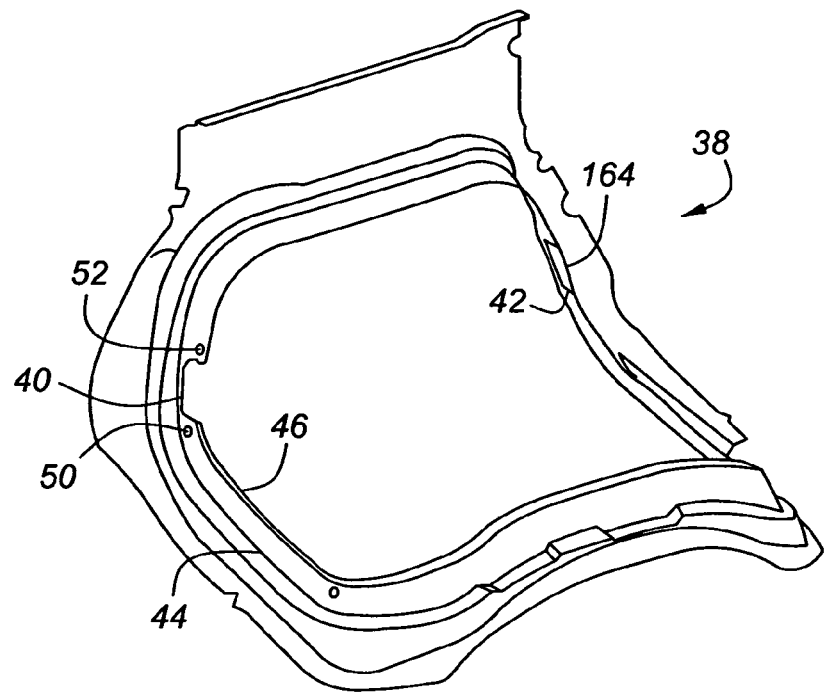
Fig. 4
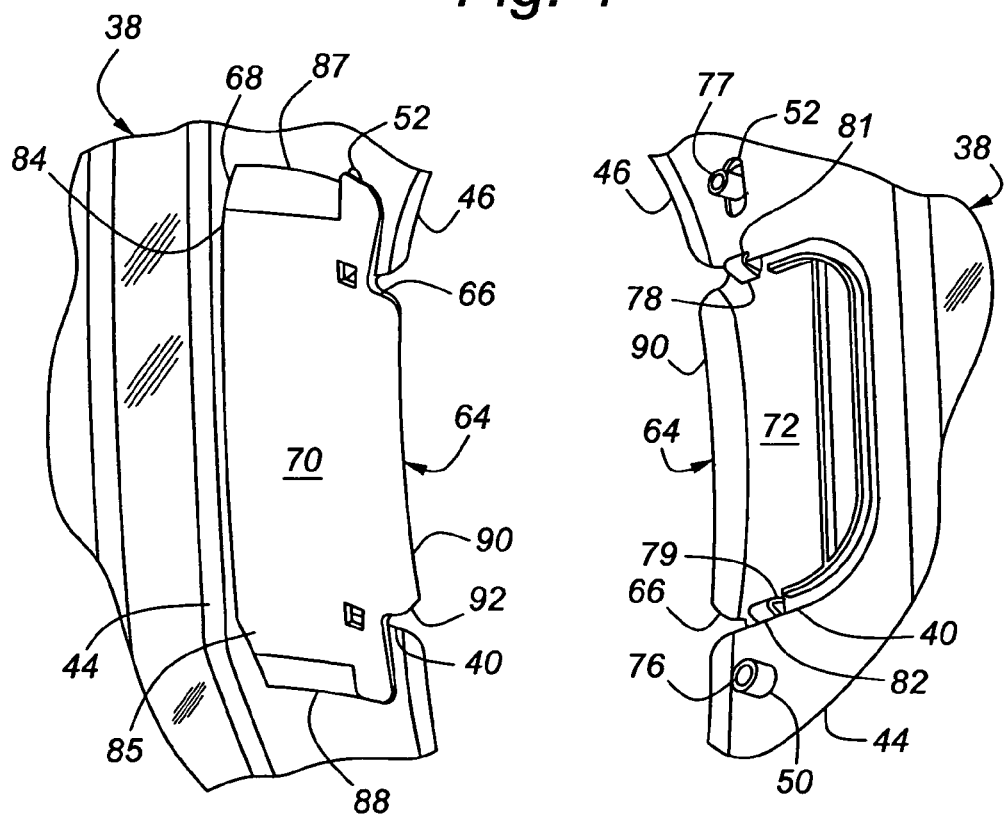
Fig. 5
Fig. 6

SEALING ACCESS PLATE

BACKGROUND OF INVENTION

The present invention relates generally to vehicle members that mount and seal together, and in particular to engine covers that mount and seal to engine rings that have removable access plates.

Many vans and small trucks are configured with short front ends and resulting engine compartments that extend partially into the passenger compartments of these vehicles. In order to separate the two compartments, an engine ring and engine cover may be employed. The engine ring mounts to the frame or body around the opening between the engine and passenger compartments. The engine cover encloses the portion of the engine extending into the passenger compartment and has a perimeter that mates and seals with the engine ring. Typically, the perimeter has a bulb or other type of seal mounted thereon in order to assure a good seal. The engine cover and engine ring, then, will help keep noise and fumes from the engine out of the passenger compartment.

One of the difficulties with the types of vehicles that have the engine compartment extending into the passenger compartment is access to certain components and subassemblies mounted to the engine. Such access may be needed for service or repair of certain parts. In particular, the engine ring and engine cover are typically located close to the engine in order to minimize the intrusion into and thus maximize the space in the passenger compartment. While the engine cover is removable, the engine ring is not, so components and subassemblies mounted on the engine adjacent to the engine ring may be very difficult or impossible to service without removing the engine from the vehicle or cutting a hole in the engine ring. For example, an engine may have an individual fuel injector for each cylinder. Aligning each fuel injector with its corresponding cylinder, then, fixes the location of the fuel injectors, even if not at the most desirable locations relative to the engine ring. With the engine ring being located close to the engine, there may be fuel injectors that cannot be removed for service without removing the engine or cutting a hole in the engine ring.

Both of these repair options have significant drawbacks. Removing the engine is very time consuming, and so presents a significant cost concern when only a small component or subassembly needs servicing. But cutting a hole in the engine ring may also be time consuming and costly, and also might reduce the effectiveness of the seal between the engine ring and engine cover more than is desirable. Thus, both options are less than satisfactory. It is desirable, therefore, to provide a way to relatively easily service engine components or subassemblies where the engine ring may interfere with such servicing, while also avoiding the drawbacks of the prior art.

SUMMARY OF INVENTION

An embodiment of the present invention contemplates an access plate for use in a vehicle to cover an aperture in a first component where the first component and a second component mate and seal against each other. The access plate may include a main body portion, made of a first material having a first durometer hardness, adapted to extend across the aperture, and defining a first portion of an outer surface adapted to sealingly engage with the second component; and a seal portion, made of a second material that has a second durometer hardness that is lower than the first material, wherein the seal portion is integral with the main body portion, the seal portion includes an underside surface in opposed relation to the outer surface that is adapted to sealingly engage with the first component, and the seal portion defines a second portion of the outer surface that is adapted to sealingly engage with the second component. The access plate may also include a retaining mechanism adapted to releasably secure the access plate to the first component.

An embodiment according to the present invention may also contemplate an assembly for use in a vehicle. The assembly may include an engine cover having a periphery with a cover seal mounted about the periphery, and an engine ring including a periphery surface sealingly engaging the cover seal and having an aperture therethrough. The assembly may also include an access plate releasably secured to the engine ring and having a main body portion, made of a first material having a first durometer hardness, extending across the aperture, and defining a first portion of an outer surface in sealing engagement with the engine cover; and a seal portion, made of a second material that has a second durometer hardness that is lower than the first material, wherein the seal portion is integral with the main body portion, and the seal portion includes an underside surface in opposed relation to the outer surface that is in sealing engagement with the engine ring around a portion of the aperture.

The access plate and the engine ring in accordance with the present invention advantageously provide a relatively simple and quick way to access engine components requiring service where the engine ring might otherwise interfere with such servicing.

An advantage of an embodiment of the present invention is that the access plate is reusable. It is easy to remove from the engine ring and easy to properly align and mount to the engine ring. The installation and removal may even be performed without any tools, if so desired.

Another advantage of an embodiment of the present invention is that the access plate provides for both a good seal between itself and the engine ring, and itself and the engine cover seal. Thus, a desirable seal between the engine compartment and passenger compartment is maintained. Moreover, the seal between the access plate and engine ring is preferably integral with but a lower durometer material than the main body of the access plate, thus minimizing the number of parts and also assuring that the seal is always in place after servicing of the vehicle is complete. Furthermore, having a higher durometer material for the main body portion may increase its stiffness, which may improve the seal between the access plate and the engine cover seal.

An additional advantage of an embodiment of the present invention is that the access plate may include a feature that minimizes the risk of catching on and damaging the engine cover seal during installation of the engine cover on the engine ring.

BRIEF DESCRIPTION OF DRAWINGS

FIG. 4 is a perspective view of an engine ring in accordance with the present invention.

FIG. 5 is a perspective view of an outer surface of a left side access plate mounted on an engine cover in accordance with the present invention.

FIG. 6 is a perspective view, similar to FIG. 5, but illustrating an underside surface of the access plate.

DETAILED DESCRIPTION

Figure 1:
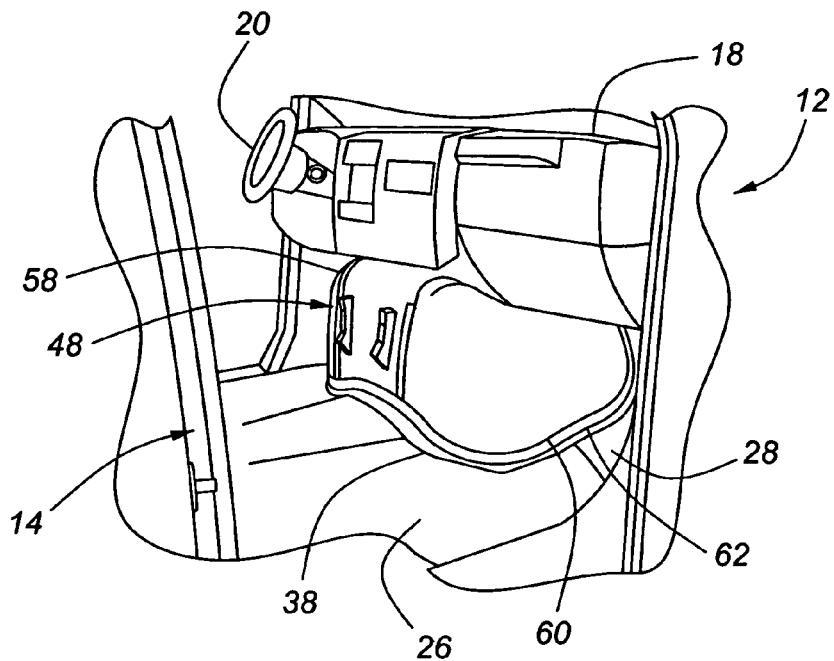
FIG. 1 is a perspective view of a portion of an interior of a vehicle, looking in through a right side door, in accordance with the present invention.
Figure 2:
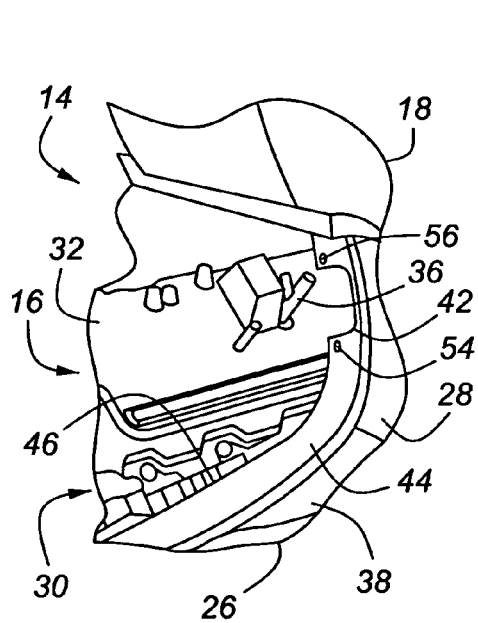
FIG. 2 is an enlarged view of a portion of FIG. 1, but with an engine cover and access plate not shown.
Figure 3:
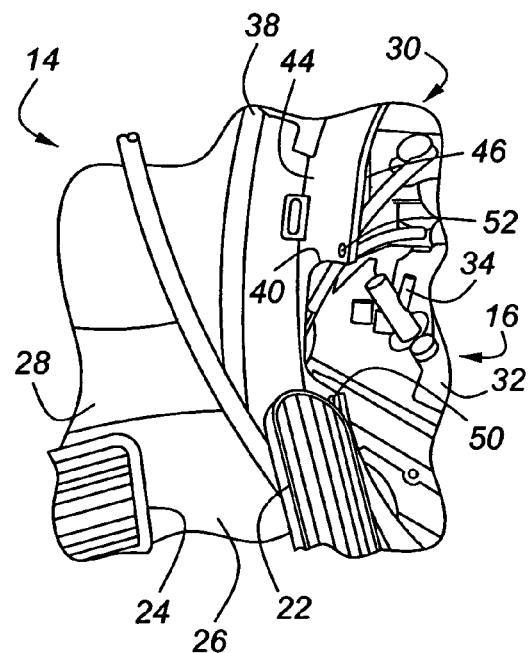
FIG. 3 is a perspective view of a portion of a vehicle interior, with an engine cover and access plate removed, and looking from the left side of the vehicle.
Figure 7:
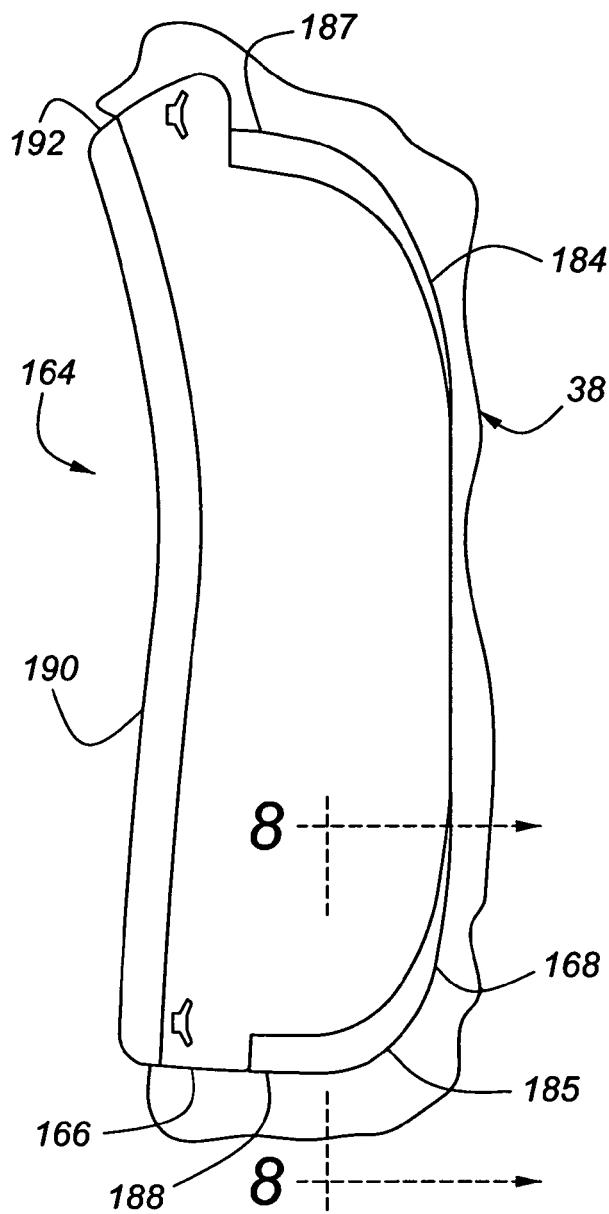
FIG. 7 is an elevation view of an outer surface of a right side access plate mounted on the engine cover in accordance with the present invention.
Figure 8:
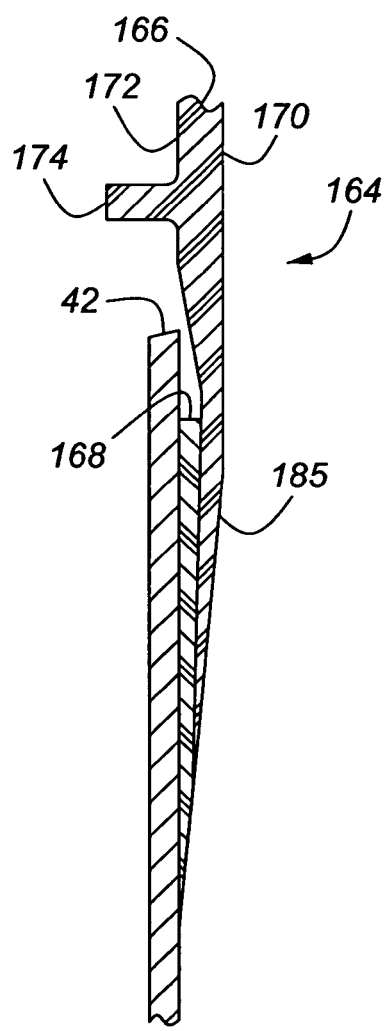
FIG. 8 is a section cut, taken along line 8-8 in FIG. 7.

Referring now to FIGS. 1-8, which illustrate the present invention, a vehicle 12, having a passenger compartment 14 and an engine compartment 16, is shown. The passenger compartment 14 may be conventional, with an instrument panel 18 extending across the front of it, a steering wheel 20 extending from the instrument panel 18, and an accelerator pedal 22 and brake pedal 24 below the instrument panel 18. A floor 26 of the passenger compartment 14 supports conventional seats (not shown for clarity in illustrating the present invention) and is connected to a dash panel 28 along its front end. A hole 30 through the floor 26 and dash panel 28 forms an opening into the engine compartment 16. An engine 32, which may be conventional, is located mostly in the engine compartment 16, but also extends through the hole 30 into the passenger compartment 14 below the instrument panel 18. The engine 32 may include fuel injectors 34, 36 extending therefrom in the vicinity of an engine ring 38.

The engine ring 38 (best seen in FIG. 4) encircles the hole 30 and is contoured to mate with and be permanently affixed to the floor 26 and dash panel 28. The overall contours and method of affixing the engine ring 38 are conventional and so will not be discussed in detail herein. An inner periphery surface 44 extends around an engine access opening 46, with the inner periphery surface 44 being in mating and sealing contact with an engine cover 48, discussed below. The engine ring 38 includes a left side aperture 40 (best seen in FIG. 3) and a right side aperture 42 (best seen in FIG. 2), each cut through the periphery surface 44. The left side aperture 40 is located to provide clearance for the removal and servicing of the fuel injector 34 and the right side aperture 42 is located to provide clearance for the removal and servicing of the fuel injector 36. While the apertures 40, 42 are located for ease of fuel injector servicing, they can be located anywhere that would assist in the repair or replacement of a particular engine component or subassembly.

The engine ring 38 also includes a first left side locating hole 50 and a second left side locating hole 52, which is preferably a slotted hole to allow for manufacturing tolerances. The locating holes 50, 52 are adjacent to opposite ends of the left side aperture 40. A first right side locating hole 54 and a second right side locating hole 56, which is again preferably a slotted hole, are adjacent to opposite ends of the right side aperture 42.

The engine cover 48, which may be conventional if so desired, includes a main body 58 that mounts over and covers the portion of the engine 32 that extends into the passenger compartment 14. An edge 60 of the cover 48 is contoured to mate with the engine ring 38 and includes a seal 62 for sealing against the inner periphery surface 44 of the engine ring 38. The seal 62 is preferably a bulb seal, although other types of seals, such as, for example, a lip seal may be employed instead.

A left side access plate 64 (best seen in FIGS. 5 and 6) bridges the left side aperture 40. The left side access plate 64 includes a main body portion 66—made of a first durometer material—that is preferably integral with a seal portion 68—made of a second, relatively lower, durometer material. For example, the main body portion 66 may be made of polypropylene—twenty percent talc-filled homopolimer, while the seal portion 68 may be made of thermoplastic elastomer. The term "integral," as used herein, means that, even though the main body portion 66 and seal portion 68 are formed of different materials that may have different hardness properties, after fabrication of the access plate 64, the main body portion 66 and the seal portion 68 are permanently affixed together to form a single monolithic entity. Preferably, the seal portion 68 is molded to the main body portion 66 to form the integral access plate 64. However, if so desired, the seal portion 68 may be formed separately first, and then permanently affixed to the main body portion 66 by adhesive, friction welding, rivets, or some other suitable means. The main body portion 66 and seal portion 68, taken together, define an outer surface 70, which faces the bulb seal 62, and an opposed underside surface 72, which faces away from the bulb seal 62.

The part of the underside surface 72 defined by the seal portion is 68 shaped to match the contours of the inner periphery surface 44 around the three sides of the left side aperture 40. Accordingly, even if the engine ring 38 is irregularly shaped at the location of the left side aperture 40, the left side access plate 64 will mate with and seal properly against it. The portion of the underside surface 72 defined by the main body portion 66 covers the left side aperture 40 and includes a stiffening flange 74 protruding outward therefrom. The main body portion 66, being made of the relatively harder material, in combination with the stiffening flange 74, will provide the stiffness needed to assure that the left side access plate 64 will not flex too much to maintain sealing contact against the bulb seal 62 of the engine cover 48.

First and second locating pins 76, 77 also protrude outward from the underside surface 72 and are positioned so that, when they align with the locating holes 50, 52, respectively, the left side access plate 64 will be located properly relative to the left side aperture 40. A pair of snap clips 78, 79 protrude from the underside surface 72 of the main body portion 66 and are located so that barbs 81, 82 on snap clips 78, 79, respectively, engage the back side of the engine ring 38 and hold the left side access plate 64 in place against the engine ring 38.

The outer surface 70 of the left side access plate 64—since it is not flush with the inner periphery surface 44 of the engine ring 38 around the left side aperture 40—includes tapered end features. A first tapered end feature 84 tapers down toward a first end 87 of left side access plate 64 and a second tapered end feature 85 tapers down toward a second end 88 of the access plate 64. This tapering at both ends 87, 88 of the access plate 64 creates a gradual transition for the bulb seal 62 to follow as it transitions from sealing against the inner periphery surface 44, to sealing against the outer surface 70, and back to sealing against the inner periphery surface 44. Abrupt steps in a sealing surface against which the bulb seal 62 is sealing would otherwise cause potential gaps, thus possibly providing a leak path between the engine compartment 16 and the passenger compartment 14. Preferably, the thinnest portions of the tapered features 84, 85 are formed of the lower durometer material of the seal portion 68 rather than the harder material of the main body portion 66. This will allow the lower durometer material to flex elastically if forces are applied to it while the access plate 64 is being removed or installed. Otherwise, if the thinnest sections were formed of the harder material, they may have more of a tendency to break rather than flex when such forces are applied.

The left side access plate 64 also includes a free (unsupported) edge 90. This free edge 90 includes a tapered edge feature 92. This tapered edge feature 92 allows the bulb seal 62 on the engine cover 48 to more easily slide onto the engine ring 38 and access plate 64 without the bulb seal 62 snagging on the free edge 90. This edge feature 92, then, will help to minimize the possibility of damage to the bulb seal 62 during engine cover 48 removal and installation. The tapered edge feature 92 may also include a curve in the tapered outer surface, if so desired.

A right side access plate 164 (best seen in FIGS. 7 and 8) bridges the right side aperture 42. This right side access plate 164 may be very similar to the left side access plate 64. The right side access plate 164 is preferably formed of a main body portion 166, having a certain durometer material, and an integral seal portion 168 formed of a relatively lower durometer material. The main body portion 166 may include a stiffening flange 174 extending from an underside surface 172. The right side access plate 164 may also include an outer surface 170 with tapered end features 184, 185 at respective ends 187, 188 thereof, with the seal portion 168 forming the thinnest parts of these features 184, 185. A free edge 190 of the right side access plate 164 may also include a tapered edge feature 192.

Basically, the left and right side access plates 64, 164, while having small variations in configuration, may be employed on either side, or one of these configurations may be employed on both sides as they each provide the same features and functions as the other. Moreover, while this vehicle 12 is shown with two apertures 40, 42 and two access plates 64, 164, the vehicle 12 may have only one aperture and access plate or may have more than two apertures and corresponding access plates, as is desired for the particular vehicle 12 and engine 32 combination.

The removal and installation of the left side access plate 64—when servicing or replacing a part on the engine 32—will now be discussed. Since the removal, installation, and features of the right side access plate 164 are essentially the same as the left side, this procedure is equally applicable thereto. The engine cover 48 is removed, the same as is conventionally done. The snap clips 78, 79 are now elastically flexed to disengage them from the sides of the left side aperture 40, allowing the access plate 64 to be pulled off of the engine ring 38. With the aperture 40 now exposed, the engine 32 may be serviced. When engine servicing is completed, the locating pins 76, 77 are aligned with the respective locating holes 50, 52. The access plate 64 is then pressed toward the inner periphery surface 44 of engine ring 38, thereby causing the snap clips 78, 79 to elastically flex and slide through the aperture 40, snapping into place. The barbs 81, 82 are now engaged on the back side of the engine ring 38. The access plate 64 is retained in its proper position, with the seal portion 68 biased against the inner periphery surface 44 of the engine ring 38. The engine cover 48 is then re-installed, as it would be done conventionally.

As can be appreciated, the access plates 64, 164 are reusable, as well as easy to remove and re-install. The harder material of the main body portions 66, 166 will provide stiffness to maintain the access plates 64, 164 against the bulb seal 62, and the tapered end features 84, 85, 184, 185 will provide smooth transition surfaces (without abrupt steps) in order to allow the bulb seal 62 to fully seal as it transitions from sealing along the outer surfaces 70, 170 of the access plates 64, 164 to sealing along the inner periphery surface 44 of the engine ring 38. Also, the tapered free edge features 92, 192 will minimize the chances that the bulb seal 62 will unintentionally engage with the free edges 90, 190 of the access plates 64, 164 as the engine cover 48 is being moved into its installed position, thus reducing the risk of damaging the bulb seal 62 during installation. Accordingly, the dual sealing features assure the access plates 64, 164 are adequately sealed against both the engine ring 38 and the engine cover 48.

While the access plates 64, 164 are illustrated providing integral dual durometer materials and other features that allow for sealing along both an engine ring 38 on one side and a bulb seal 62 of an engine cover 48 on the opposite side, such access plates may be employed in other locations of the vehicle where the dual sealing functions around a hole and along the surface of the plate are needed. Moreover, the particular aperture being covered could be a hole with four supported surfaces rather than one free edge. With such an aperture, then, the seal portion may extend around the entire periphery of access plate, if so desired. Consequently, while certain embodiments of the present invention have been described in detail, those familiar with the art to which this invention relates will recognize various alternative designs and embodiments for practicing the invention as defined by the following claims.

What is claimed is:

1. An assembly for use in a vehicle to seal against an engine cover, the assembly comprising:
   an engine ring including a periphery surface adapted to sealingly engage the engine cover and having an aperture therethrough;
   an access plate releasably secured to the engine ring and having a main body portion, made of a first material having a first durometer hardness, extending across the aperture, and defining a first portion of an outer surface adapted to sealingly engage with the engine cover; and a seal portion, made of a second material that has a second durometer hardness that is lower than the first material, wherein the seal portion is integral with the main body portion, and the seal portion includes an underside surface in opposed relation to the outer surface that is in sealing engagement with the engine ring around a portion of the aperture.

2. The assembly of claim 1 wherein the engine ring includes a first locating hole and a second locating hole adjacent to the aperture, and the main body portion of the access plate defines a portion of the underside surface and includes a first locating pin extending from the underside surface through the first locating hole, and a second locating pin, spaced from the first locating pin, extending from the underside surface through the second locating hole.

3. The assembly of claim 1 wherein the access plate includes a pair of snap clips operatively engaging the engine ring for releasably securing the access plate to the engine ring.

4. The assembly of claim 1 wherein the access plate includes a first end and an opposed second end, wherein the outer surface includes a first tapered end feature that tapers down toward the first end and a second tapered end feature that tapers down toward the opposed second end.

5. The assembly of claim 4 wherein the access plate further includes a free edge extending between the first and second ends, and the outer surface adjacent to the free edge includes a tapered edge feature that tapers down toward the free edge.

6. The assembly of claim 4 wherein the seal portion defines a second portion of the outer surface adapted to be in sealing engagement with the engine cover, and the first tapered end feature and the second tapered end feature extend over at least the second portion of the outer surface.

7. The assembly of claim 1 wherein the engine ring includes a first locating hole and the main body portion defines a portion of the underside surface and includes a first locating pin extending from the underside surface that operatively engages the first locating hole.

8. The assembly of claim 1 wherein the main body portion defines a portion of the underside surface and includes a stiffening flange extending from the underside surface, with the stiffening flange located in the aperture.

9. An assembly for use in a vehicle comprising:
an engine cover having a periphery with a cover seal mounted about the periphery;
an engine ring including a periphery surface sealingly engaging the cover seal and having an aperture therethrough;
an access plate releasably secured to the engine ring and having a main body portion, made of a first material having a first durometer hardness, extending across the aperture, and defining a first portion of an outer surface in sealing engagement with the engine cover; and a seal portion, made of a second material that has a second durometer hardness that is lower than the first material, wherein the seal portion is integral with the main body portion, and the seal portion includes an underside surface in opposed relation to the outer surface that is in sealing engagement with the engine ring around a portion of the aperture.

10. The assembly of claim 9 wherein the engine ring includes a first locating hole and a second locating hole adjacent to the aperture, and the main body portion of the access plate defines a portion of the underside surface and includes a first locating pin extending from the underside surface through the first locating hole, and a second locating pin extending from the underside surface through the second locating hole.

11. The assembly of claim 10 wherein the access plate includes a first end and an opposed second end, wherein the outer surface includes a first tapered end feature that tapers down toward the first end and a second tapered end feature that tapers down toward the opposed second end.

12. The assembly of claim 11 wherein the seal portion defines a second portion of the outer surface adapted to be in sealing engagement with the engine cover, and the first tapered end feature and the second tapered end feature extend over at least the second portion of the outer surface.

13. The assembly of claim 10 wherein the access plate includes a pair of snap clips operatively engaging the engine ring for releasably securing the access plate to the engine ring.

14. The assembly of claim 9 wherein the engine ring includes a second aperture through the periphery surface, and the assembly further includes a second access plate extending across the second aperture and releasably secured to the engine ring, with the second access plate including an outer surface in sealing engagement with the cover seal and an underside surface, in opposed relation to the outer surface, in sealing engagement with the engine ring around a portion of the second aperture.

* * * * *